(12) United States Patent
Knuenz et al.

(10) Patent No.: US 7,894,130 B2
(45) Date of Patent: Feb. 22, 2011

(54) STEREOMICROSCOPE HAVING A BEAM SPLITTER DEVICE

(75) Inventors: Lothar Knuenz, Rankweil (AT); Heinz Suhner, Rebstein (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 506 days.

(21) Appl. No.: 11/923,110

(22) Filed: Oct. 24, 2007

(65) Prior Publication Data

US 2008/0100893 A1 May 1, 2008

(30) Foreign Application Priority Data

Oct. 27, 2006 (DE) ........................ 10 2006 050 846

(51) Int. Cl.
*G02B 21/00* (2006.01)
(52) U.S. Cl. ........................ 359/384; 359/368; 359/372
(58) Field of Classification Search .......... 359/368–390
See application file for complete search history.

(56) References Cited

U.S. PATENT DOCUMENTS

| 5,552,929 | A | 9/1996 | Fukaya et al. | |
|---|---|---|---|---|
| 6,473,229 | B2* | 10/2002 | Nakamura | 359/377 |
| 6,804,051 | B2* | 10/2004 | Deverin | 359/431 |
| 2006/0215258 | A1* | 9/2006 | Strobel et al. | 359/368 |

FOREIGN PATENT DOCUMENTS

| DE | 19504427 A1 | 9/1995 |
|---|---|---|
| DE | 10157613 A1 | 10/2002 |
| EP | 1308766 B1 | 5/2003 |
| EP | 1486813 A1 | 12/2004 |

* cited by examiner

*Primary Examiner*—Thong Nguyen
(74) *Attorney, Agent, or Firm*—Hodgson Russ LLP

(57) ABSTRACT

A stereomicroscope (20) has first and second main beam paths (21, 22) whose spacing defines a stereo base (23), a microscope axis (24) proceeding through the center of the stereo base (23) parallel to the main beam paths; and an optical beam splitter device (30) for generating an assistant's beam path (31) and a documentation beam path (32), the assistant's beam path being outcoupled from the first main beam path in a first position of the beam splitter device, and from the second main beam path in a second position, and the documentation beam path being outcoupled from the other main beam path; and the direction of the assistant's beam path in the first position being rotated 180° relative to the assistant's beam path in the second position; and the outcoupled documentation beam path extending, in both positions of the beam splitter device, perpendicular to the outcoupled assistant's beam path.

26 Claims, 11 Drawing Sheets

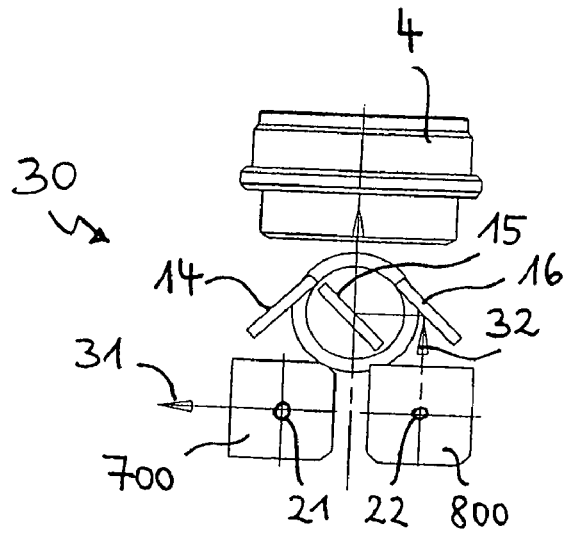
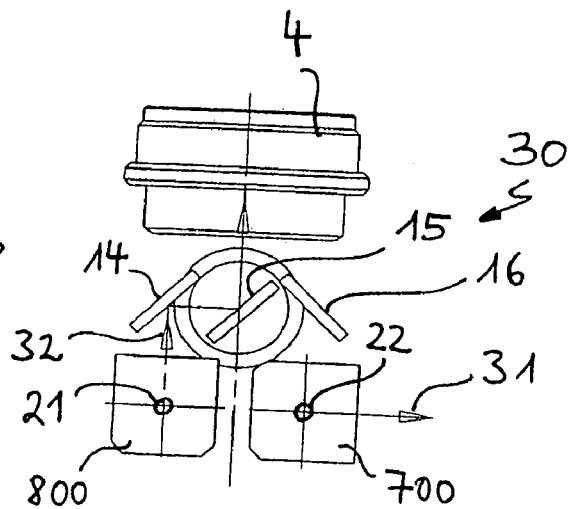
Fig. 9A    Fig. 9B
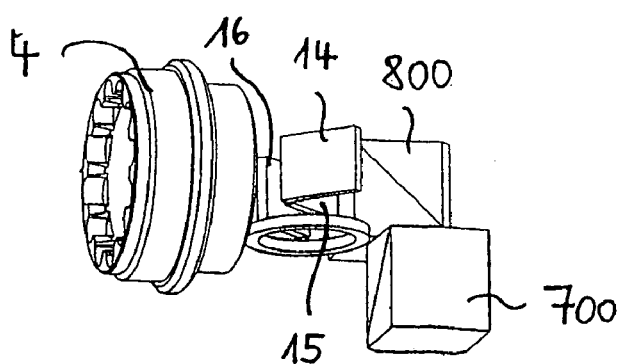
Fig. 9C

STEREOMICROSCOPE HAVING A BEAM SPLITTER DEVICE

CROSS REFERENCE TO RELATED APPLICATIONS

This application claims priority of German patent application 10 2006 050 846.7 filed Oct. 27, 2006, which is incorporated by reference herein.

FIELD OF THE INVENTION

The present invention relates to a stereomicroscope having a first and a second main beam path whose spacing defines a stereo base, such that a microscope axis proceeds through the center of the stereo base parallel to the main beam paths; and having an optical beam splitter device for generating an assistant's beam path and a documentation beam path.

BACKGROUND OF THE INVENTION

Stereomicroscopes of this kind are used, in particular, in opthalmologic and neurosurgical operations. In such cases a binocular tube, through which the surgeon or principal surgeon can observe the object stereoscopically, is arranged after the beam splitter device. Stereomicroscopes of this kind can be of the telescopic type (Galilean system), one main objective common to both main beam paths being arranged on the microscope body. Also known are microscopes of the Greenough type, in which one objective is provided for each main beam path. A magnification changer or zoom system is often placed after the objective. This allows a variety of fixed magnifications, or a continuous magnification range, to be achieved. One channel of a magnification changer (zoom system) is provided for each of the two channels (main beam paths) of the stereomicroscope, such that both magnification changer/zoom system channels are to be adjusted or displaced synchronously. With such a configuration, the aforesaid beam splitter device is usefully arranged after the magnification changer/zoom system. Stereomicroscopes of this kind are sufficiently known and therefore will not be discussed in detail here.

When a stereomicroscope of this kind is used as a surgical microscope, an assistant's beam path is often coupled (faded) out of one of the two, or both, main beam paths, and directed to an interface for an assistant's tube, allowing the assistant or co-observer to view an image of the object through said assistant's tube. When the assistant's beam path is coupled out of only one of the two main beam paths, a monoscopic (non-three-dimensional) image is present. An assistant's beam path of this kind can, however, be split into two channels (small stereo base) in the assistant's tube, so that a stereoscopic image with less of a three-dimensional impression can be obtained. It is also useful and known to couple out a documentation beam path that is delivered to a documentation module or to a documentation device. These documentation modules can be, for example, electro-optical imagers (CCD arrays) or other image memories, which can acquire and store image sequences or individual images. By means of such documentation devices, for example, the course of an operation can be recorded for documentation purposes, or individual images of the object can be stored for later analysis.

Be it noted in this connection that the terms "assistant's beam path" and "documentation beam path" were selected merely for better illustration of the use of the stereomicroscope according to the present invention, and can be replaced by the general terms "secondary beam path" and "tertiary beam path," respectively, if these beam paths are to be used differently. The discussion below will refer, for reasons of simplicity, to assistant's beam paths and documentation beam paths, without limiting the invention to a stereomicroscope having corresponding assistant's or documentation modules.

In the context of the aforesaid surgical microscopes, a desire exists to place the assistant or co-observer selectably on the left or the right side of the microscope. It is known for this purpose to couple out an assistant's beam path from both the left and the right main beam path, and direct it to a corresponding interface on the microscope housing. If the corresponding microscope is equipped with only one assistant's tube, however, the latter must be reinstalled from one side to the other upon an assistant changeover. Such installation entails risks and sterility problems. For reasons of weight and cost, the provision of two fixed assistant's tubes would not be advantageous.

Solutions additionally exist in which the assistant's tube is embodied pivotably in a horizontal plane. The horizontal plane here represents a plane that extends perpendicular to the plane containing the two main beam paths of the stereomicroscope. These solutions require two additional assistant's main beam paths proceeding parallel to the two main stereo beam paths, resulting in a complex four-beam microscope construction. A further disadvantage of such solutions is that the main observer's tube must first be removed, or at least swung aside, before the assistant's tube can be pivoted.

EP 1 486 813 A1 discloses a surgical stereomicroscope having an assistant's tube that is arranged on the rear side of the microscope, pivotably in a plane parallel to the main stereo beam paths. The main observer's tube is arranged on the front side of the microscope. The assistant's tube is guided out toward the rear on the rear side of the microscope, and can be pivoted from the left to the right side and back, depending on the assistant's desired position. Outcoupling of a documentation beam path is not addressed here. With an arrangement of this kind, application of a counterweight to the pivotable assistant's tube is advantageous for reasons of stability. This once again turns out to be disadvantageous in practice, however, for reasons of cost, weight, and alignment.

DE 195 04 427 B4 discloses a stereo microscope having a single optical system, i.e. only one channel, the main objective and a magnification changer being followed by a beam splitter element. The beam splitter element couples a secondary observation beam path out of the primary observation beam path. The beam splitter element involves of three separate prisms. Located after the beam splitter element are two optical elements, arranged adjacently to one another, that supply an intermediate image of the object being viewed, said image being detected by two electro-optical image sensors. A configuration of this kind is suitable for a video stereomicroscope. The secondary observation beam path is also imaged onto an image sensor of this kind. The entire optical system of the secondary observation beam path, including the beam splitter element, is mounted rotatably about a rotation axis that extends through the pupil used jointly by the primary and the secondary observation beam path. This proposed design is not suitable for a double-beam stereomicroscope. Here the beam splitter rotates about a correspondingly wide channel of the main beam path. This document also does not address the outcoupling of a further tertiary (or documentation) beam path.

Lastly, U.S. Pat. No. 5,552,929 discloses a stereomicroscope having a main observer's tube, a co-observer's tube, and a documentation output. This, too, involves a so-called "Single Optical System" in which the split into two beam paths is performed only in the tube. Outcoupling of the beam paths into a beam path for the main observer and co-observer is accomplished using beam splitters that are arranged in a correspondingly wide channel of the main beam path. The design proposed here is not suitable for double-beam stereomicroscopes, since in the latter, the image would also rotate upon pivoting of a tube. Prisms would therefore in turn need to be provided in order to rotate the image back.

In other known double-beam stereomicroscopes, a so-called (semi-)stereo assistant has hitherto been attached laterally on the beam splitter. The latter is not pivotable, since the (video) documentation system, to which the second main beam path is delivered, is already attached on the opposite side. The absence of a capability for assistant changeover is very highly disadvantageous here for the user. Other solutions, already addressed, utilize a four-beam microscope configuration that results in stereomicroscopes in a substantially higher price class.

SUMMARY OF THE INVENTION

It is therefore an object of the present invention to create a stereomicroscope having a double-beam configuration and an optical beam splitter device for generating an assistant's beam path and a documentation beam path, in which stereomicroscope a simple assistant changeover is possible, such that, in particular, the brightness conditions of the main stereoscopic observation system remain uninfluenced by such an assistant changeover.

This object is achieved, according to the present invention, by a stereomicroscope according to the invention disclosed herein.

In order to achieve the object, a stereomicroscope of the kind cited initially is proposed in which an optical beam splitter device is provided in order to generate an assistant's beam path and a documentation beam path, the assistant's beam path being capable of being outcoupled from the first main beam path in a first position of the beam splitter device, and from the second main beam path in a second position, and the documentation beam path being capable of being outcoupled from the respective other main beam path; and the direction of the assistant's beam path in the first position being rotated substantially 180° with respect to the direction of the assistant's beam path in the second position of the beam splitter device; and the outcoupled documentation beam path extending, in both positions of the beam splitter device, respectively, perpendicular to the outcoupled assistant's beam path.

With the stereomicroscope according to the present invention, the assistant's beam path and the documentation beam path are therefore each coupled out from a different one of the two main beam paths. In both cases, monoscopic viewing, or stereoscopic viewing with less of a three-dimensional impression of the image, is consequently possible. The beam splitter device is configured in such a way that (at least) two different positions can be assumed, in which the assistant's beam path is rotated 180° in order to enable an assistant changeover. Because the outcoupled documentation beam path extends perpendicular to the outcoupled assistant's beam path in both cases, an assistant changeover of this kind is possible with no risk of collision with the interface for documentation, since that interface can be arranged, for example, on the rear side of the stereomicroscope while the interface to the assistant is located, for example, in the right and the left side of the microscope housing. If this interface is embodied pivotably, pivoting can then take place over the front side of the microscope. Because the assistant's beam path can always be coupled out from one of the main beam paths, and the documentation beam path always out of the respective other main beam path, the brightness conditions for the main observer, the assistant, and for documentation always remain the same in the context of an assistant changeover.

The configuration of a stereomicroscope according to the present invention can correspond, aside from the beam splitter device, to the previously known configuration described above. The discussion below will be based, with no limitation as to generality, on a configuration having one main objective, after which is usually placed a magnification changer or zoom system having two channels that define the two main beam paths, the beam splitter device being adjacent to the magnification changer/zoom system. A binocular tube for stereoscopic viewing of the object and/or a connector for a documentation module for (electro-optical) documentation of the object viewing can be arranged downstream. This binocular tube is usually utilized by a main observer (surgeon). To simplify the description that follows, let it be assumed that the main observer is placed at the front side of the microscope, that the interface for documentation is arranged on the rear side of the microscope, and that advantageously an interface to an assistant's module is provided, which interface is located in a housing rotatable at least 180° about the microscope axis. Be it noted, however, that the invention can also be implemented if two mutually oppositely located interfaces to an assistant's module (for example, on the left and right of the microscope housing) are provided. A disadvantage of such an approach, however, would be the need to remove and install an assistant's tube, or the need for two fixed assistant's tubes. Instead of the aforementioned binocular tube it is also possible, of course, to arrange a (video) image sensor with which, for example, three-dimensional image viewing can be enabled.

It is additionally advantageous if the aforesaid rotatable housing that carries the interface to the assistant's module surrounds the optical beam splitter device, and if said beam splitter device can be brought into its aforesaid first or second position by a rotary motion of the housing (for the purpose of an assistant changeover). Because a 180-degree rotation of the housing is associated with the assistant changeover, this rotation can be used for a rotation of the optical components of the beam splitter device. If, for example, only a 90-degree rotation of said optical components should be necessary, then a corresponding conversion of the rotary motions is necessary. Let it be emphasized once again at this juncture that a mechanical coupling of the rotatable housing with the beam splitter device and its optical components is not absolutely necessary. This is because it is also conceivable for a 180-degree rotation of the housing having the assistant's interface to be detected, and for the beam splitter device thereupon to be brought from its first position into its second position (or back), for example by a separate drive associated with the beam splitter device.

It is additionally advantageous if a connector for a documentation module is mounted on the fixed microscope housing, said connector being installed in particular on a displaceable carriage. The reason is that because, upon an assistant changeover, the corresponding assistant's beam path is coupled out of the respective other main beam path, the documentation beam path must also be coupled out of the respective other main beam path (this ensures that the brightness remains the same in both channels). If the documentation interface is configured displaceably, the latter can therefore, upon an assistant changeover, likewise switch its pickoff from one beam path to the other. It is particularly useful for this purpose if the aforesaid carriage enables a displacement of the documentation interface (the connector for the documentation module) along the stereo base by an amount equal to the length thereof. It is once again useful if such a displacement is accomplished automatically with a rotary motion of the housing that comprises the interface to the assistant's module.

It is advantageous in the context of such an arrangement if the connector for the documentation module is arranged outside the rotation range of the interface (mounted on the rotatable housing) to the assistant's module; this should be the case for any possible position of the documentation interface on the aforesaid carriage.

It will become understandable, based on the particular preferred embodiments of the invention that will be explained, that a linear displaceability of the connector for documentation is not absolutely necessary. The outcoupled documentation beam path can instead be directed by means of a beam deflector to a connector for documentation fixed to the microscope.

With no limitation as to generality, it will be assumed hereinafter that the outcoupled assistant's beam paths lie (in both positions of the beam splitter device) in a horizontal plane that extends perpendicular to the plane in which the two main beam paths of the microscope are located. The outcoupled documentation beam path is intended to be located in the same horizontal plane or in one parallel thereto.

Various preferred embodiments of the invention, in particular of the beam splitter device, will be further explained below; one skilled in the art may discover by a combination of features, on the basis of the fundamental principles that are explained, other possible solutions that are within the scope of the present invention.

Firstly, it is advantageous if the beam splitter device comprises only two optical beam splitters that are each arranged in one of the two main beam paths, in particular next to one another. The two beam splitters thus couple out an assistant's beam path and a documentation beam path, respectively. Because the direction of the outcoupled assistant's beam path extends perpendicular to that of the outcoupled documentation beam path, it is easy, in the context of an assistant changeover, to rotate the two beam splitters 90° respectively about their own (center) axis, which is coincident with the respective main beam path. The beam splitter that was outcoupling the assistant's beam path in the first position therefore outcouples the documentation beam path in the second position. The same applies, conversely, to the other beam splitter. The 90-degree rotation occurs in the same direction for both beam splitters. With a corresponding conversion for the rotations, for example, a rotation of the beam splitters can be coupled to a rotation of the housing that comprises the interface to the assistant's module. Without beam deflection of the outcoupled documentation beam path, the documentation connector must be shifted by an amount equal to the distance between the two beam splitters (i.e. parallel to the stereo base by an amount equal to the magnitude of the stereo base). Alternatively, it is possible to use beam deflectors with which, even after an assistant changeover (beam splitter device transition from the first into the second position or vice versa), the outcoupled documentation beam path is directed to a fixed documentation connector. Multiple, in particular three, beam deflectors are provided for this in the beam splitter device on the side of the outcoupled documentation beam path, at least one of which is pivotable as a function of a rotation of one of the two (or both) beam splitters. If the documentation connector is arranged, for example, symmetrically with respect to the center of the stereo base, three beam deflectors (mirrors) can be used, with the two respective outer beam deflectors performing a deflection of the outcoupled documentation beam path to the documentation connector. Upon an assistant changeover, the center beam deflector must then be rotated 90° (or an angle adapted to the optical design) together with the two beam splitters (cf. first and second preferred embodiments in the exemplifying embodiments).

In an alternative embodiment, the two beam splitters can be arranged rotatably, together, 180° about the microscope axis. In this case the beam splitter that outcouples the assistant's beam path in the first position of the beam splitter device also handles outcoupling of the same beam path in the second position, in which both beam splitters are rotated 180°. To ensure that the documentation beam path continues to be outcoupled in the same direction (e.g. toward the rear side of the microscope), it is necessary additionally to rotate the beam splitter responsible for documentation 180° about its own axis (which lies on the main beam path).

In another embodiment, the beam splitter device comprises four optical beam splitters, of which two are arranged in each of the two main beam paths. The arrangement of the beam splitters each above one another in the direction of a main beam path results in a light loss for the main observer. One advantage of such an approach can be, however, that the transition of the beam splitter device from its first position into the second position (and vice versa) can be implemented using fewer moving optical elements.

In yet another embodiment, the beam splitter device comprises two optical beam splitters that are each arranged in one of the two main beam paths in such a way that they are arranged offset from one another in the direction of the microscope axis (in the direction of the main beam paths). In this fashion, the two beam splitters can be placed "diagonally" into the two main beam paths. With such an arrangement, it is useful if one of the two beam splitters is arranged rotatably 180° about the microscope axis. This once again allows one beam splitter (e.g. the lower one) to be selected for outcoupling the assistant's beam path, while the other (e.g. the upper one) is selected for outcoupling the documentation beam path. Upon an assistant changeover, the beam splitter responsible for the assistant's beam path is then rotated 180° about the microscope axis (beam splitter device transition from the first into the second position (or vice versa)). As an alternative to rotating the beam splitter 180° about the microscope axis, the same result can be achieved by first rotating the beam splitter 180° about its own axis and then displacing it along the stereo base by an amount equal to the length of the stereo base.

As already discussed in connection with other embodiments, with the diagonal arrangement of two optical beam splitters being considered here it is also possible for the documentation connector to be arranged, in the context of the beam splitter arrangement transition from the first into the second position (or vice versa), displaceably parallel to the stereo base by an amount (at least) equal to the length of the stereo base, or else for the outcoupled documentation beam path to be directed by means of beam deflectors to a fixedly arranged documentation connector. The previously discussed arrangement having three beam deflectors is again a good choice here. Reference is made in this connection to the sixth and seventh embodiments that are further explained in the exemplifying embodiments.

The features of the invention set forth above can be used not only in the combination indicated here, but also in other combinations or in isolation, without leaving the context of the invention.

BRIEF DESCRIPTION OF THE DRAWING FIGURES

Various embodiments of the invention are intended below, in conjunction with the appended Figures, to further explain the invention and its advantages.

FIG. 1 schematically shows the basic configuration of a stereomicroscope according to the invention, in a side view;

FIG. 9 is a detail view of a sixth preferred embodiment with the beam splitter device in its first position (FIG. 9A), in its second position (FIG. 9B), and in a perspective view (FIG. 9C);

Figure 11:
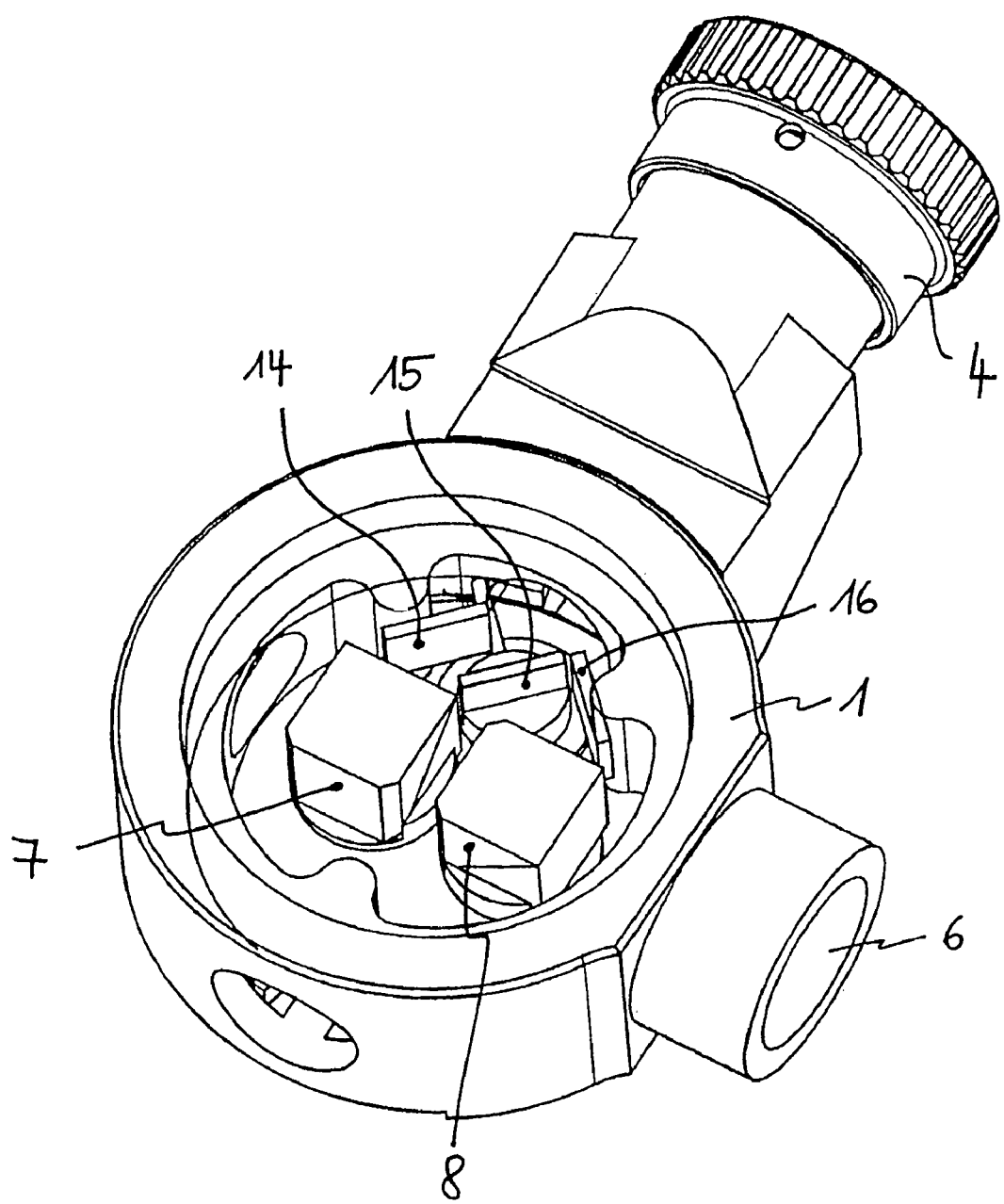

FIG. 11 schematically shows a perspective view of the second preferred embodiment of the invention.

DETAILED DESCRIPTION OF THE INVENTION

Figure 1:
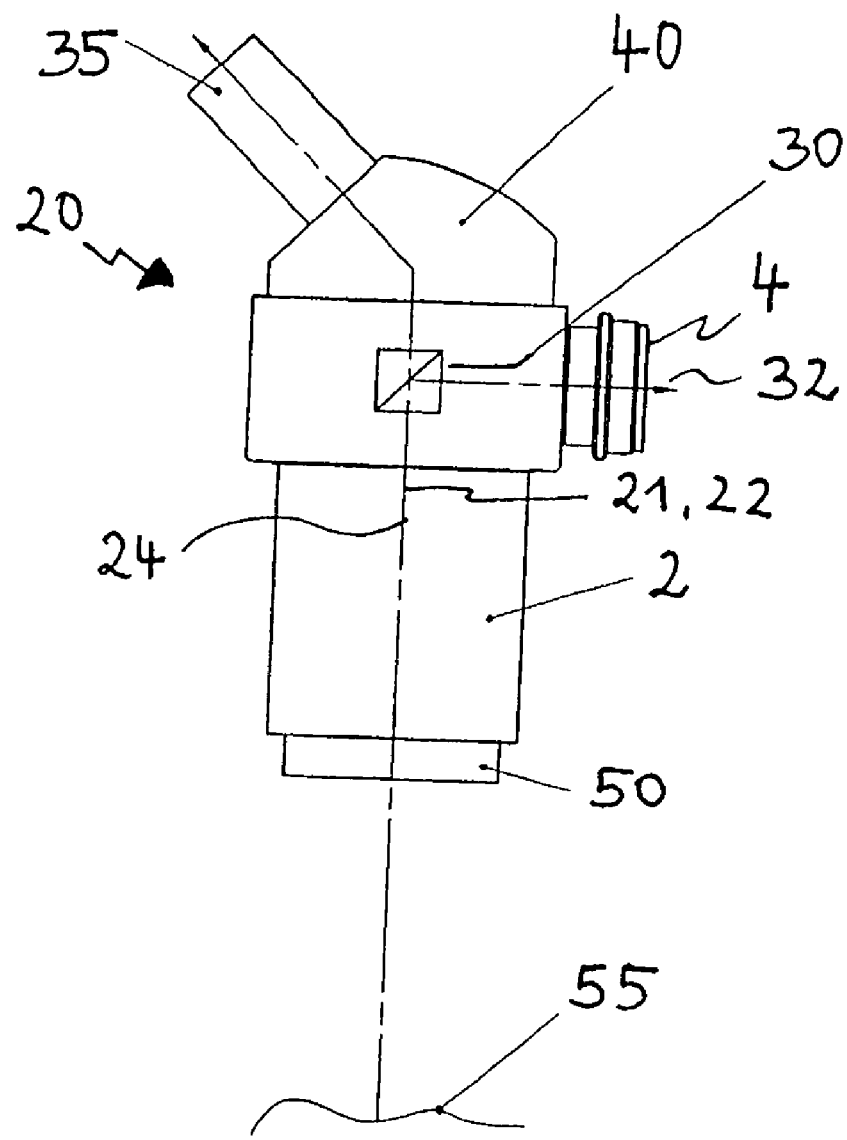

FIG. 1 schematically shows the basic configuration of a stereomicroscope 20 according to the invention, in a side view. An object 55 located at the focus of objective 50 of stereomicroscope 20 is imaged through a binocular tube 40 having two eyepieces 35 (only one of eyepieces 35 is visible in the side view), and this image can be viewed by a main observer (for example, a surgeon). In such stereomicroscopes 20, two channels of a magnification system, such as a zoom system or magnification changer, are usually provided between objective 50 and binocular tube 40 for continuous or stepwise modification of the magnification. Because this configuration is known per se, it will not be further explained below. The two optical channels of the magnification system are arranged next to one another in microscope body 2 in a plane perpendicular to the drawing plane. They define a first and a second main beam path 21 and 22, respectively. Provided in these two main beam paths 21, 22 is a beam splitter device 30 that couples out from the main beam paths an assistant's beam path 31 and a documentation beam path 32, respectively. In the exemplifying embodiment considered in FIG. 1, documentation beam path 32 is coupled out toward the rear side of stereomicroscope 20 and directed to a connector 4 for documentation. Beam splitter device 30 is in this case depicted schematically as a beam splitter. Assistant's beam path 31 is coupled out perpendicular to documentation beam path 32, an interface to the assistant's module being located in a plane that proceeds perpendicular to the drawing plane through the sketched beam splitter. Interface 6 to the assistant's module is consequently located on the left or right side of the microscope housing. The number 24 designates the microscope axis, which in this case proceeds symmetrically between the two main beam paths 21, 22.

Figure 2:
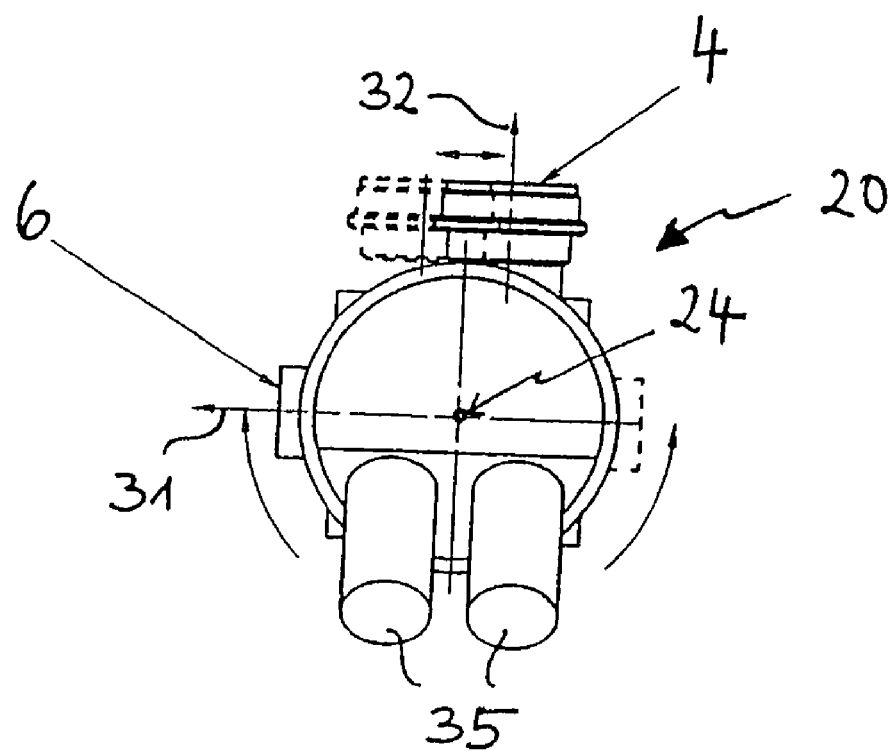
FIG. 2 is a schematic view of the stereomicroscope according to FIG. 1, in a top view.

FIG. 2 is a schematic view of stereomicroscope 20 according to FIG. 1, in a top view. In the embodiment considered here, interface 6 to the assistant's module is assumed to be embodied pivotably through at least 180°, in a plane that contains the cross section of microscope body 2 (in this case identical to the drawing plane), about microscope axis 24. It is also assumed that connector 4 for documentation is arranged in linearly displaceable fashion parallel to stereo base 23, which defines the spacing between the first and the second main beam path. The solid lines in FIG. 2 designate the first position of beam splitter device 30, while the dashed lines in FIG. 2 designate the second position of beam splitter device 30. Specifically, in this case a pivoting of interface 6 to the assistant's module is coupled to a linear displacement of connector 4 for documentation, beam splitter device 30 being transferred by said motions from the first into the second position (or vice versa). As already mentioned several times, a linear displacement of connector 4 for documentation is not absolutely necessary; the outcoupled documentation beam path 32 can instead be directed with the aid of beam deflectors (mirrors) to a point fixed to the microscope.

Figure 3A:
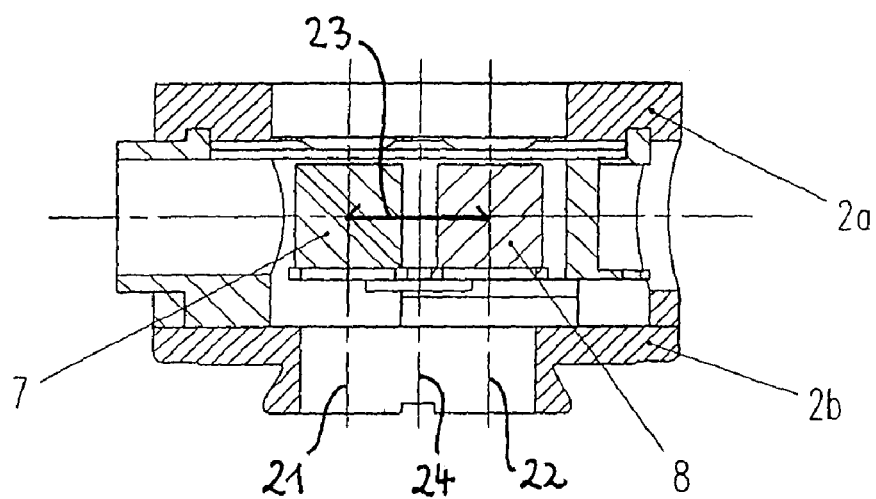
FIG. 3 is a detail view of an advantageous embodiment of a stereomicroscope, as a cross section in a vertical plane (FIG. 3A) and in a horizontal plane (FIG. 3B)
Figure 3B:
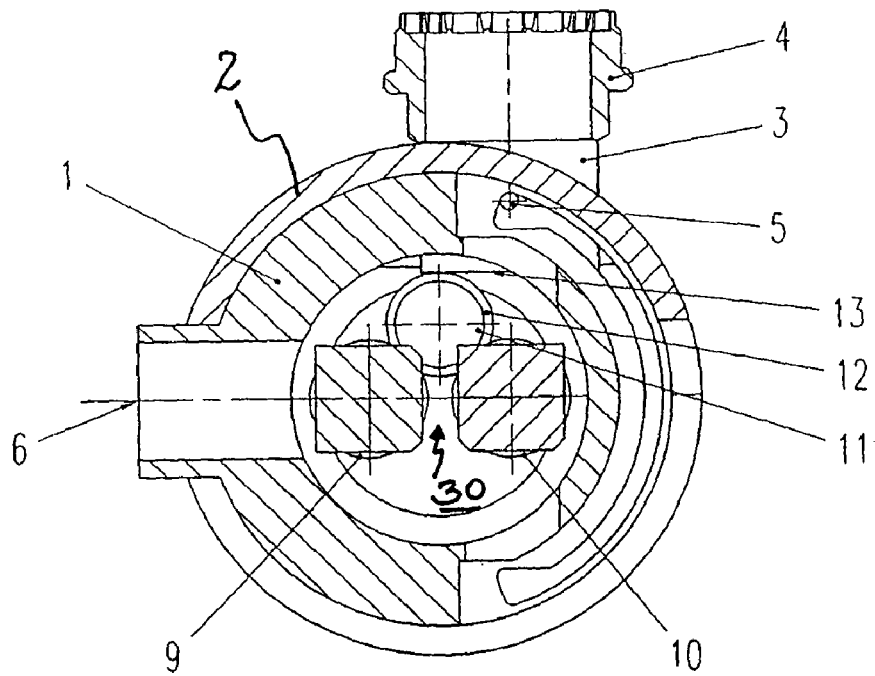

FIG. 3 shows a particularly advantageous embodiment of a stereomicroscope in which a rotation of interface 6 to the assistant's module is coupled both to a displacement of connector 4 for documentation and to a changeover of beam splitter device 30 from a first into a second position. FIG. 3A is a cross section in a plane that contains main beam paths 21 and 22; FIG. 3B is a cross section in a horizontal plane perpendicular to the plane of FIG. 3A. The number 2 designates the (stationary) microscope housing that surrounds a rotatable housing 1, which in turn is equipped with an interface 6 to an assistant's module (not depicted). Interface 6 can be rotated 180° about microscope axis 24 in the drawing plane according to FIG. 3B. A connector 4 for a documentation module (likewise not depicted) is installed on a carriage 3 on the rear side of microscope housing 2. The number 5 designates a driver pin that, upon rotation of interface 6 to the assistant's module, constrainedly entrains connector 4 for documentation on carriage 3. The displacement of connector 4 preferably occurs in linear fashion parallel to stereo base 23.

In the example depicted according to FIG. 3, beam splitter device 30 is substantially made up of two beam splitters or splitter prisms 7 and 8. Splitter prism 7 is arranged in main beam path 21, and splitter prism 8 in main beam path 22 (cf. FIG. 3A). The housing parts of the microscope are labeled 2a and 2b. As is evident from FIG. 3B, beam splitters 7 and 8 are mounted on a ring gear 9 and 10, respectively, ring gears 9, 10 being in engagement with spur gear 11 that is coupled to spur gear 12, which in turn moves toothed rack 13. Upon a rotation of rotatable housing 1, a constrained entrainment of connector 4 via carriage 3 thus occurs, and a constrained rotation of beam splitters 7 and 8 via the mechanism made up of toothed rack 13, spur gears 11, 12, and ring gears 9, 10. FIG. 3 depicts a particular embodiment. As already mentioned, other embodiments are conceivable, in particular those in which entrainment or rotation does not occur constrainedly, but instead is performed, for example, by means of separate drives. Beam splitter device 30 depicted in FIG. 3 is depicted merely by way of example in order to illustrate the mechanism. The embodiment depicted in FIG. 3 will be explained again in terms of its function with reference to FIG. 4.

FIGS. 4 to 10 illustrate the manner of operation of seven different preferred embodiments, depicting only beam splitter device 30 (by way of beam splitters and any beam deflectors), as well as connector 4 for documentation in its respective position. The depictions according to FIGS. 4 to 10 can readily be inserted into the overall depiction according to FIG. 3, or transferred into such an overall depiction, in order to arrive from there at a stereomicroscope according to the present invention. Seven preferred embodiments will be briefly explained below, with no discussion of possible alternative configurations. Such alternative configurations have already been indicated earlier in the description. FIGS. 4 to 10 are constructed in such a way that the figure portions labeled A and B depict beam splitter device 30 in its first and second position, respectively, while the figure portion labeled C provides a perspective depiction in each case.

Figure 4A:
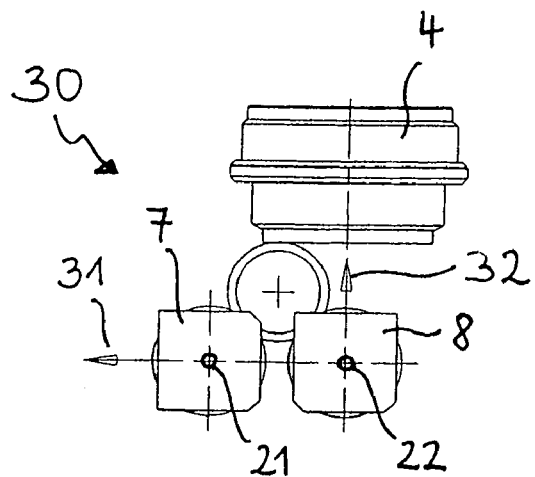
FIG. 4 is a detail view of a first preferred embodiment with the beam splitter device in its first position (FIG. 4A), in its second position (FIG. 4B), and in a perspective view (FIG. 4C)
Figure 4B:
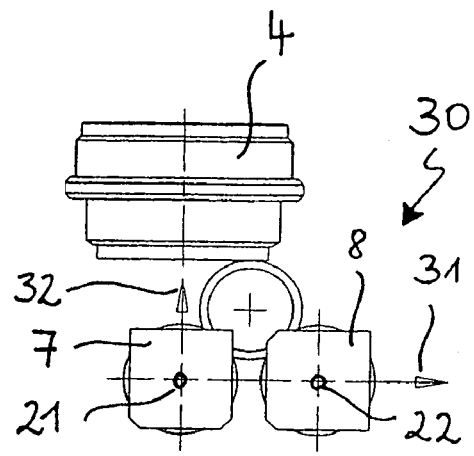
Figure 4C:
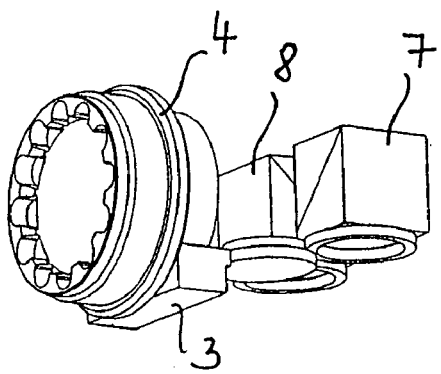

FIG. 4 schematically shows a first particularly preferred embodiment, FIG. 4C showing a perspective view of connector 4 for documentation (with carriage 3) as well as the position of the two beam splitters 7 and 8 (with ring gears and spur gears). FIG. 4A shows the first position of beam splitter device 30, in which position an assistant's beam path 31 is coupled out of first main beam path 21 toward the left side of the microscope. Perpendicular thereto, documentation beam path 32 is coupled out toward the rear side of the microscope. The outcoupling of assistant's beam path 31 is performed by a beam splitter 7 that usefully allows 50% of the light of main beam path 21 to pass toward the binocular tube, and couples or fades out the remaining 50% in the direction indicated. A splitter prism is suitable as beam splitter 7. The situation is analogous for the outcoupling of documentation beam path 32. The latter is delivered directly to the connector for documentation.

FIG. 4B shows the second position of beam splitter device 30, which is obtained from the first position by a 90-degree clockwise rotation of both beam splitters 7 and 8, in which context documentation connector 4 must additionally be displaced parallel to stereo base 23 by an amount equal to the spacing of beam splitters 7 and 8, which spacing corresponds to the stereo base. In the new position, beam splitter 8 is responsible for outcoupling assistant's beam path 31, and beam splitter 7 for outcoupling documentation beam path 32. Documentation connector 4 must correspondingly be displaced to the left in the drawing in front of beam splitter 7.

Figure 5A:
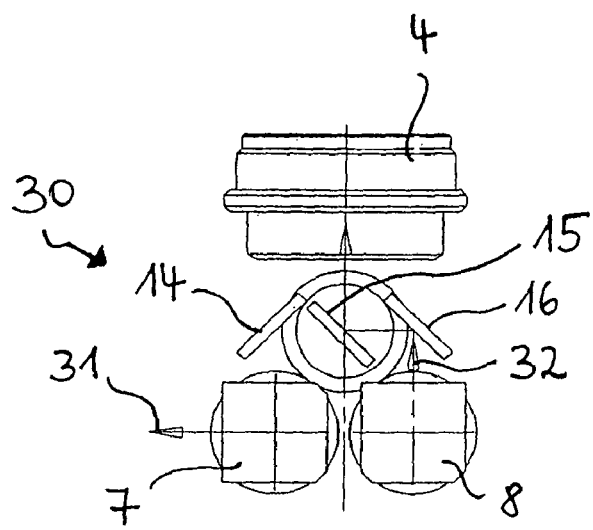
FIG. 5 is a detail view of a second preferred embodiment with the beam splitter device in its first position (FIG. 5A), in its second position (FIG. 5B), and in a perspective view (FIG. 5C)
Figure 5B:
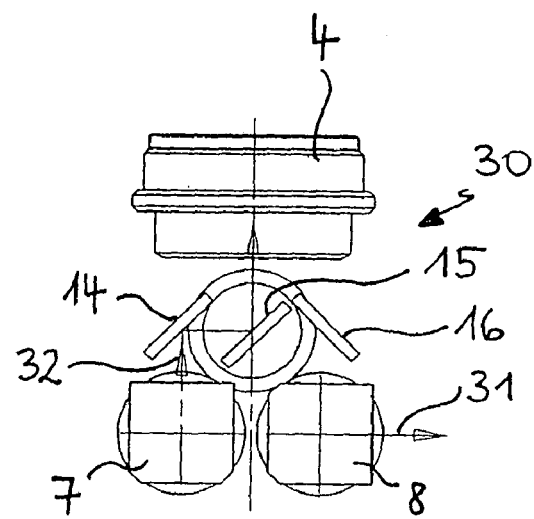
Figure 5C:
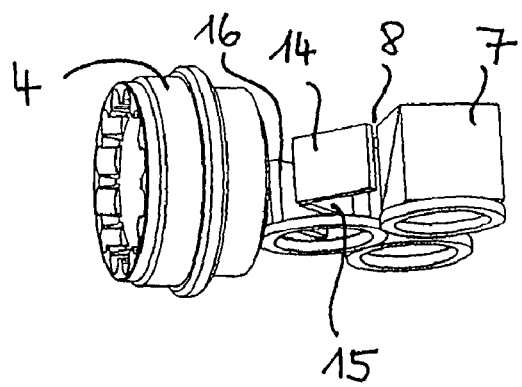

FIG. 5 shows a preferred second embodiment of the invention that is based on the configuration according to FIG. 4, a stationary documentation connector 4 being provided on the microscope instead of a displaceable documentation connector 4. The outcoupled documentation beam path 32 is deflected by an arrangement of beam deflectors (mirrors) 14, 15, and 16, and directed to documentation connector 4. In the first position (FIG. 5A), beam splitter 7 is once again (cf. FIG. 4A) responsible for outcoupling assistant's beam path 31. Documentation beam path 32 is outcoupled from main beam path 22 via beam splitter 8, and firstly directed onto beam deflector 16, which deflects the beam at a right angle. From there the beam travels to beam deflector 15, which likewise performs a deflection of the beam, at a right angle or at an angle adapted to the optical design, in the direction of documentation connector 4. With this embodiment, the transition to the second position (FIG. 5B) is accomplished by a 90-degree clockwise rotation of the individual beam splitters 7 and 8 about their own axes (which each lie on the main beam path), and additionally by a 90-degree counterclockwise rotation of beam deflector 15 about an axis parallel to microscope axis 24 and to main beam paths 21, 22. The remaining beam deflectors 14 and 16 remain unchanged in their positions. In this second position, as is evident from FIG. 5B, beam splitter 8 is now responsible for outcoupling assistant's beam path 31, while beam splitter 7 is responsible for outcoupling documentation beam path 32, which is directed by means of beam deflectors 14 and 15 to documentation connector 4. FIG. 5C once again shows a perspective view of the configuration of the second embodiment.

Figure 6A:
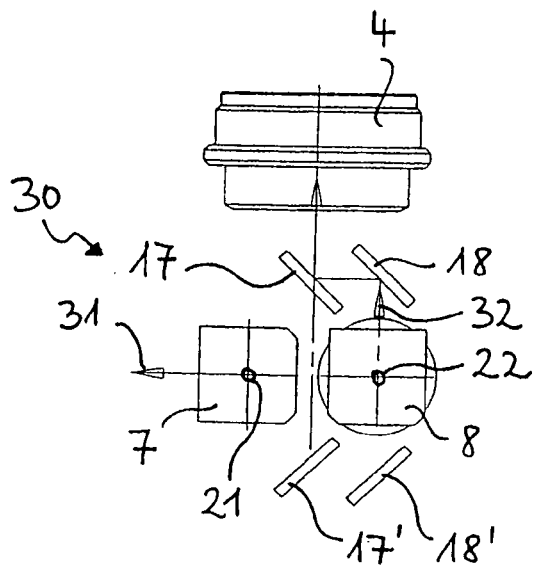
FIG. 6 is a detail view of a third preferred embodiment with the beam splitter device in its first position (FIG. 6A), in its second position (FIG. 6B), and in a perspective view (FIG. 6C)
Figure 6B:
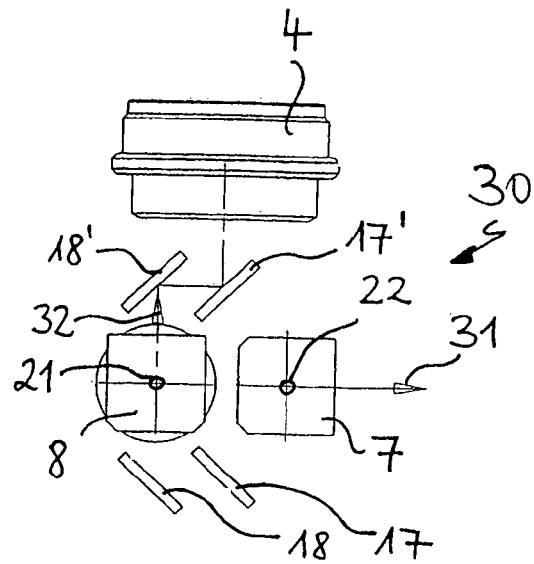
Figure 6C:
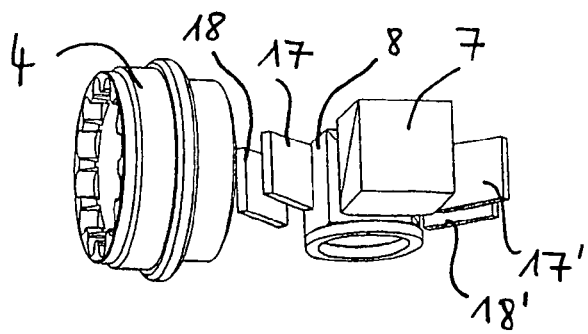

FIG. 6 shows a third preferred embodiment of the invention, once again having two beam splitters 7 and 8. In this case beam splitters 7 and 8 are coupled to one another and mounted to rotate, together, 180° about the main axis (microscope axis 24). In the first position of beam splitter device 30, beam splitter 7 handles the outcoupling of assistant's beam path 31. A beam splitter 8 is once again provided to outcouple documentation beam path 32, beam splitter device 30 comprising two beam deflectors 17, 18 to deflect the outcoupled documentation beam path 32 into documentation connector 4. Upon an assistant changeover, the transition into the second position of beam splitter device 30 is accomplished by way of the aforesaid 180-degree rotation, the entire optical group being rotated about the main axis. In addition, in the case depicted here, beam splitter 8 for documentation beam path 32 is also rotated 180° about its own axis in order to achieve an outcoupling in the direction of documentation connector 4. The outcoupled documentation beam path 32 can now be directed toward the documentation connector via two further beam deflectors 17', 18' that are arranged symmetrically with respect to beam deflectors 17 and 18. Because, in this embodiment, the outcoupling of the documentation beam path 32 from the respective other main beam path is also performed along with the assistant changeover, the documentation connector 4 must be correspondingly displaced. It is once again useful for this purpose to displace the documentation connector 4 linearly, parallel to the stereo base, by an amount equal to the length thereof. Alternative arrangements are apparent here to one skilled in the art, and have also already been outlined above in the description. For example, instead of the 180-degree rotation of beam splitter 8, a beam deflection of documentation beam path 32 into documentation connector 4 could also be achieved solely by way of differently arranged beam deflectors.

Instead of the aforesaid displacement of the documentation connector, however, it may be useful to mount the latter in stationary fashion on the microscope housing. It is useful in this case if multiple, in particular two, beam deflectors 17', 18' are arranged in the beam splitter device 30, each on opposite sides of one of the optical beam splitters 7, 8, and fixedly joined to the latter. With two beam deflectors it is possible, for example, firstly to deflect the documentation beam path 32 outcoupled toward the rear side of the microscope into a direction perpendicular thereto, and then redirect it in turn, by way of the second beam deflector, in a direction perpendicular thereto and parallel to the outcoupling direction. The outcoupled documentation beam path 32 can thereby be offset laterally, for example, in such a way that it proceeds in a direction perpendicular to the center of the stereo base. The documentation connector 4 can be arranged correspondingly in centeredly stationary fashion. The two beam deflectors 17', 18' are arranged on both opposite sides of the beam splitter responsible for documentation, the respective opposite pair of beam deflectors 17, 18 being used after each 180-degree deflection.

Figure 7A:
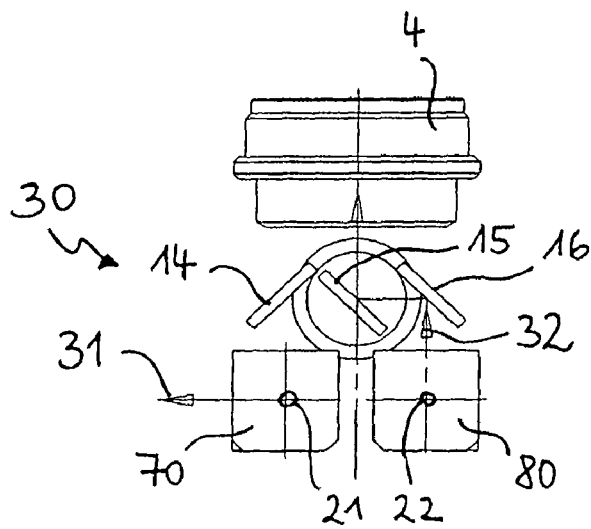
FIG. 7 is a detail view of a fourth preferred embodiment with the beam splitter device in its first position (FIG. 7A), in its second position (FIG. 7B), and in a perspective view (FIG. 7C)
Figure 7B:
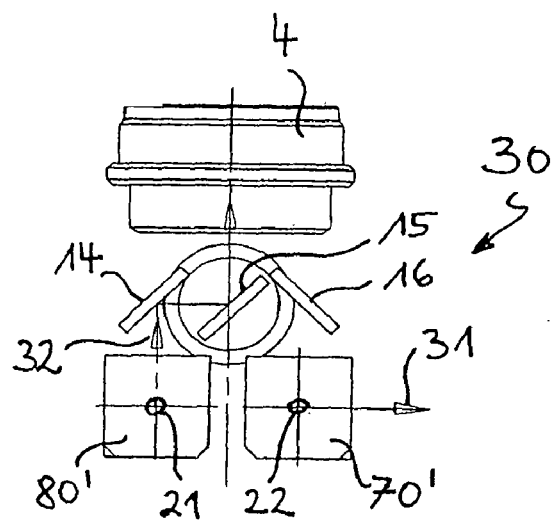
Figure 7C:
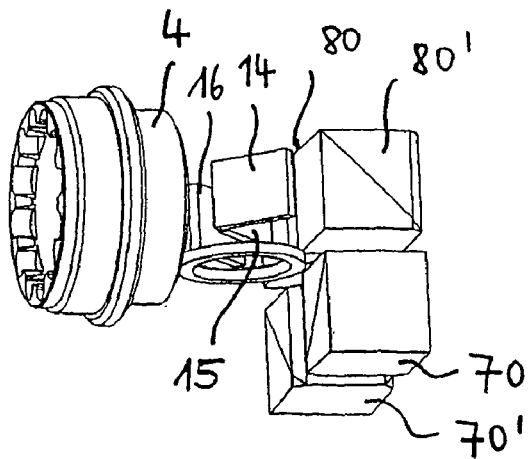

FIG. 7 shows a further preferred fourth embodiment of the invention, four beam splitters 70, 70' and 80, 80' being provided here as depicted in FIG. 7C. Beam splitters 80, 80' and 70, 70' are respectively arranged next to one another, two beam deflectors 70, 80' on the one hand and 70', 80 on the other hand being arranged in the two main beam paths 21 and 22, respectively (cf. FIG. 7C). Beam splitters 70 and 70' are responsible for outcoupling an assistant's beam path 31, and beam splitters 80, 80' for outcoupling a documentation beam path 32.

It is desirable, if two beam splitters 70, 70' arranged next to one another each outcouple an assistant's beam path 31, the two lower beam splitters 70, 70' (as seen from the object) being used, for example, for this. In the same fashion, it is desirable if the other two beam splitters 80, 80' arranged next to one another each outcouple a documentation beam path 32. These can be the two upper beam splitters 80, 80' (as viewed from the object). With such an arrangement one assistant's beam path 31 is therefore outcoupled from each main beam path 21, 22, only one assistant's beam path 31, in particular, being in fact used. The same applies analogously to the documentation beam path 32. In a first position of the beam splitter device, the assistant's beam path 31 (from the first main beam path 21) is then directed to the assistant's module, while the documentation beam path 32 (from the second main beam path 22) is directed to the documentation module. Upon an assistant changeover, the respective other beam paths are used for the outcoupled assistant's and documentation beam paths. Once again, either the documentation connector 4 is arranged to be linearly displaceable by an amount equal to the length of the stereo base and parallel thereto, or the outcoupled documentation beam path 32 is directed via beam deflectors to a fixed location of the documentation connector. The previously discussed arrangement of three beam deflectors is particularly suitable for this. In this case only the center beam deflector 15 needs to be pivoted 90° (or another angle adapted to the optical design) when the beam splitter design switches from the first into the second position (and vice versa). With this arrangement, either only the documentation connector 4 or only one beam deflector therefore has to be embodied displaceably or rotatably. The number of parts to be moved is thus small.

FIG. 7A once again depicts the first position of beam splitter device 30, the respectively active beam splitters 70, 80 being drawn in for better clarity. In this first position, assistant's beam path 31 is coupled out through beam splitter 70 toward the left side of the microscope. Documentation beam path 32 is coupled out toward the rear side of the microscope by beam splitter 80 located diagonally opposite. Once again, a redirection of the outcoupled documentation beam path to a stationary documentation connector 4 is achieved via a beam deflector arrangement (mirror arrangement) 14, 15, 16. In this fourth embodiment, the transition into the second position (depicted in FIG. 7B) of beam splitter device 30 is accomplished simply by a 90-degree rotation of center beam deflector 15, documentation beam path 32 outcoupled through beam splitter 80' now being directed via beam deflectors 14 and 15 into documentation connector 4. In the second position, beam splitter 70' is responsible for outcoupling assistant's beam path 31.

The advantage of the fourth embodiment is that only one component (mirror 15) needs to be moved; four beam splitters are necessary, however, thereby causing a light loss in the main beam paths that in some circumstances can have a negative effect for the main observer.

Figure 8A:
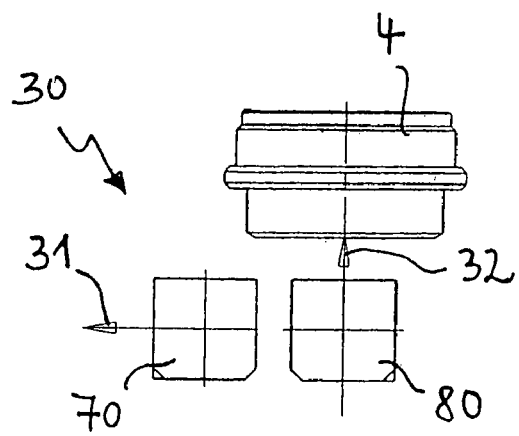
FIG. 8 is a detail view of a fifth preferred embodiment with the beam splitter device in its first position (FIG. 8A), in its second position (FIG. 8B), and in a perspective view (FIG. 8C)
Figure 8B:
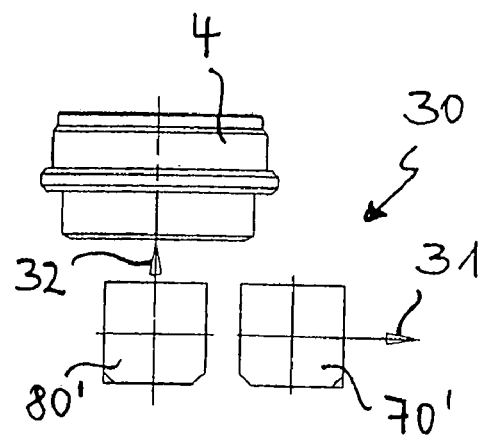
Figure 8C:
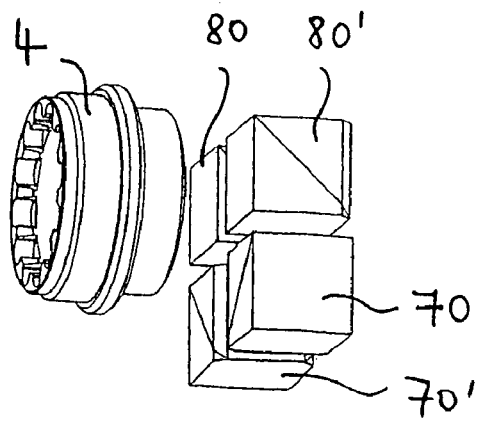

FIG. 8 shows a modified embodiment of the fourth embodiment of FIG. 7. In this fifth embodiment, in contrast to the fourth embodiment, documentation connector 4 is mounted displaceably. As a result, beam deflectors 14, 15, and 16 can be dispensed with. Upon the changeover from the first position (FIG. 8A) to the second position (FIG. 8B), documentation connector 4 is displaced by an amount equal to the distance between beam splitters 80, 80' (i.e. the stereo base). Otherwise the point already made in connection with the fourth embodiment still applies. The advantage of the fifth embodiment is that no moving optical elements at all are necessary, but that documentation connector 4 instead simply needs to be displaceable in known fashion.

FIG. 9 shows a sixth embodiment of the invention, two diagonally arranged beam splitters 700 and 800, instead of four beam splitters, now being introduced into main beam paths 21 and 22, respectively. Beam splitter 700 is responsible for outcoupling assistant's beam path 31, and beam splitter 800 for outcoupling documentation beam path 32. In a manner entirely analogous to what is depicted in FIG. 7A, documentation beam path 32 is outcoupled by beam splitter 800 and directed via beam deflectors 15 and 16 into documentation connector 4. Reference may therefore be made to what has already been stated. The transition into the second position is now accomplished either by rotating beam splitter 700 180° about its own axis and then displacing it parallel to the stereo base by an amount equal to the length of the stereo base, or by rotating beam splitter 700 180° about microscope axis 24, with the result that beam splitter 700 occupies the position depicted in FIG. 9B. In this position, assistant's beam path 31 is coupled out toward the right side of the microscope. At the same time, beam splitter 800 responsible for the documentation beam path is displaced to the left in the direction of first main beam path 21 by an amount equal to the length of the stereo base, so that documentation beam path 32 is now outcoupled from first main beam path 21 and directed via beam deflectors 14 and 15 to documentation connector 4. This requires that center mirror 15 rotate 90° about its own axis. The number of moving optical elements is therefore greater in this sixth embodiment; no additional light loss takes place as compared with the fourth and fifth embodiments.

Figure 10A:
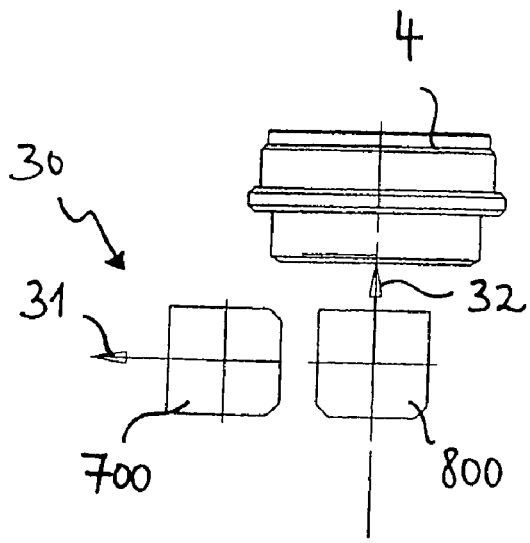
FIG. 10 is a detail view of a seventh preferred embodiment with the beam splitter device in its first position (FIG. 10A), in its second position (FIG. 10B), and in a perspective view (FIG. 10C)
Figure 10B:
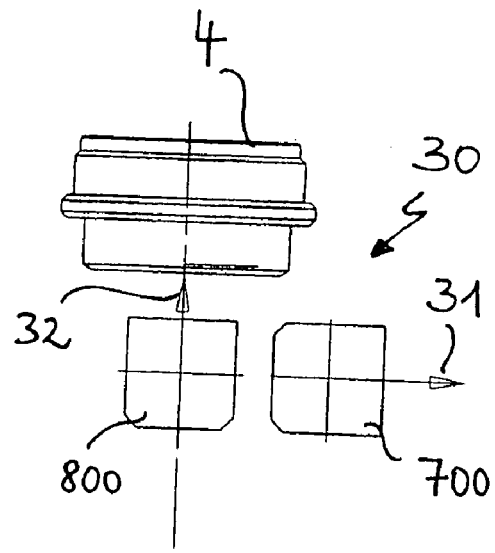
Figure 10C:
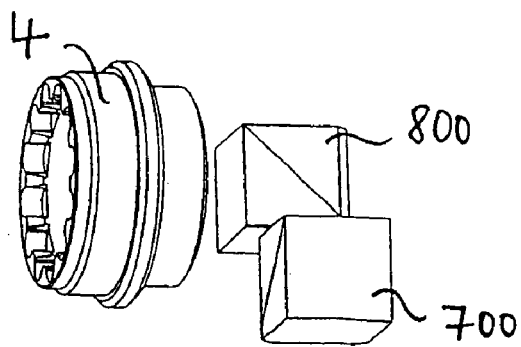

Lastly, a preferred seventh embodiment will be discussed with reference to FIG. 10. This embodiment refers to the sixth embodiment according to FIG. 9, documentation connector 4 merely being arranged, in a manner already set forth, displaceably in a direction parallel to the stereo base by an amount equal to the length of the stereo base. Beam deflectors 14, 15, and 16 of the sixth embodiment can, as a result, be dispensed with. Beam splitters 700 and 800 need to be moved in the manner already referred to in order to get from the first position (FIG. 10A) into the second position (FIG. 10B), reference being made explicitly to the sixth embodiment.

The (upper) beam splitter 800 responsible for the documentation beam path 32 is moved onto the other main beam path upon an assistant changeover, for example by being displaced along the stereo base by an amount equal to the length of the stereo base. Be it noted that mixed forms are also possible in which, for example, three beam splitters are used, so that, for example, once again two beam splitters are responsible for outcoupling the assistant's beam path. Movement of the aforesaid beam splitter for the assistant's beam path can thereby be avoided.

Lastly, FIG. 11 is a schematic perspective view of the second preferred embodiment of the invention described above. The Figure depicts the two beam splitters 7 and 8 and the three beam deflectors 14, 15, and 16, which together constitute the essential elements of optical beam splitter device 30. The latter is surrounded by a rotatable housing 1 in order to enable an assistant changeover from the right to the left side of the microscope (and vice versa). The interface to the assistant's module is once again labeled 6. The documentation connector is once again labeled 4.

The invention makes available a stereomicroscope that has an assistant's output and documentation output and can advantageously be used in particular in surgery. It permits easy assistant changeovers without colliding with the documentation interface or with the main observer's tube. The proposed arrangements (cf. the first to seventh embodiments) are ergonomic and functional. The proposed rotatable housing for the assistant changeover with constrained entrainment of the components of beam splitter device 30, which latter switches from its first position into the second position upon pivoting of the rotatable housing, allows an automatic assistant changeover that is extremely convenient for the user, and moreover has no effect on image brightness or image orientation. The proposed embodiments can be implemented relatively economically with no need for a four-beam microscope configuration that would result in disproportionately high costs.

PARTS LIST

1 Rotatable housing
2, 2a, 2b Microscope housing
3 Carriage
4 Connector for documentation
5 Driver pin
6 Interface to assistant's module
7 Beam splitter, splitter prism
8 Beam splitter, splitter prism
9 Ring gear
10 Ring gear
11 Spur gear
12 Spur gear
13 Toothed rack
14, 15, 16 Beam deflector
17, 17' Beam deflector
18, 18' Beam deflector
20 Stereomicroscope
21 First main beam path
22 Second main beam path
23 Stereo base
24 Microscope axis
30 Optical beam splitter device
31 Outcoupled assistant's beam path
32 Outcoupled documentation beam path
35 Eyepiece
40 Binocular tube
50 Objective
55 Object
70, 70' Beam splitter, splitter prism
80, 80' Beam splitter, splitter prism
700 Beam splitter, splitter prism
800 Beam splitter, splitter prism

What is claimed is:

1. A stereomicroscope comprising:
    a first main beam path and a second main beam path whose spacing from each other defines a stereo base;
    a microscope axis proceeding through the center of the stereo base parallel to the first and second main beam paths; and
    an optical beam splitter device for generating an assistant's beam path and a documentation beam path, wherein
    the beam splitter device is adjustable to a first position in which the assistant's beam path is outcoupled from the first main beam path and the documentation beam path is outcoupled from the second main beam path, and to a second position in which the assistant's beam path is outcoupled from the second main beam path and the documentation beam path is outcoupled from the first main beam path;
    the assistant's beam path is outcoupled in a first direction when the beam splitter device is in the first position and is outcoupled in a second direction 180 degrees opposite the first direction when the beam splitter device is in the second position; and
    the documentation beam path is outcoupled in a third direction perpendicular to the first and second directions.

2. The stereomicroscope according to claim 1, further comprising a binocular tube arranged downstream from the optical beam splitter device.

3. The stereomicroscope according to claim 1, further comprising a connector arranged downstream from the optical beam splitter device and adapted for receiving a documentation module.

4. The stereomicroscope according to claim 3, further comprising a fixed microscope housing, wherein the connector for a documentation module is mounted on the fixed microscope housing by a displaceable carriage.

5. The stereomicroscope according to claim 1, further comprising a housing rotatable through a range of at least 180° about the microscope axis, the housing including an interface for interfacing with an assistant's module.

6. The stereomicroscope according to claim 5, wherein the rotatable housing surrounds the beam splitter device, and the beam splitter device is brought into the first position or the second position by rotation of the housing.

7. The stereomicroscope according to claim 5, further comprising a fixed microscope housing and a connector arranged downstream from the optical beam splitter device and adapted for receiving a documentation module, wherein the connector for the documentation module is mounted on the fixed microscope housing by a displaceable carriage, and the connector for the documentation module is outside the rotation range of the interface to the assistant's module in all displacement positions provided by the displaceable carriage.

8. The stereomicroscope according to claim 1, wherein the beam splitter device includes two optical beam splitters arranged one in each of the first and second main beam paths.

9. The stereomicroscope according to claim 8, wherein each of the two beam splitters is rotatable through at least 90 degrees about its own respective axis.

10. The stereomicroscope according to claim 9, further comprising a fixed microscope housing and a connector arranged downstream from the optical beam splitter device and adapted for receiving a documentation module, wherein the connector for the documentation module is mounted on the fixed microscope housing by a displaceable carriage and is linearly displaceable relative to the fixed microscope housing in a direction parallel to the stereo base by a distance which is at least equal to a distance defined by the stereo base.

11. The stereomicroscope according to claim 9, wherein the beam splitter device further includes three beam deflectors associated with the outcoupled documentation beam path, at least one of the three beam deflectors being pivotable as a function of a rotation of one of the two beam splitters.

12. The stereomicroscope according to claim 8, wherein the two beam splitters are rotatable together as a unit through at least 180 degrees about the microscope axis.

13. The stereomicroscope according to claim 12, wherein one of the two beam splitters is rotatable through at least 180 degrees about its own axis.

14. The stereomicroscope according to claim 12, wherein the beam splitter device further includes two pairs of beam deflectors arranged on opposite sides of the two beam splitters, the two pairs of beam deflectors being rotatable together with the two beam splitters as a unit about the microscope axis.

15. The stereomicroscope according to claim 8, wherein the two beam splitters are offset from one another in a direction of the microscope axis.

16. The stereomicroscope according to claim 15, wherein one of the two beam splitters is rotatable through at least 180 degrees about the microscope axis.

17. The stereomicroscope according to claim 15, wherein one of the two beam splitters is rotatable through at least 180 degrees about its own axis, and is displaceable along the stereo base by a distance which is at least equal to a distance defined by the stereo base.

18. The stereomicroscope according to claim 17, wherein the other of the two beam splitters is displaceable along the stereo base by a distance which is at least equal to a distance defined by the stereo base.

19. The stereomicroscope according to claim 18, further comprising a connector arranged downstream from the optical beam splitter device and adapted for receiving a documentation module, wherein the connector for the documentation module is displaceable in a direction parallel to the stereo base by a distance which is at least equal to a distance defined by the stereo base.

20. The stereomicroscope according to claim 18, wherein the beam splitter device further includes three beam deflectors associated with the outcoupled documentation beam path, at least one of the three beam deflectors being pivotable to transfer the beam splitter device from the first position into the second position.

21. The stereomicroscope according to claim 1, wherein the beam splitter device includes four optical beam splitters arranged two in each of the first and second main beam paths.

22. The stereomicroscope according to claim 21, wherein two of the four beam splitters are arranged alongside one another to outcouple the assistant's beam path in the first position and the second position of the beam splitter device, respectively.

23. The stereomicroscope according to claim 21, wherein two of the four beam splitters are arranged alongside one another to outcouple the documentation beam path in the first position and the second position of the beam splitter device, respectively.

24. The stereomicroscope according to claim 23, wherein the beam splitter device further includes three beam deflectors associated with the outcoupled documentation beam path, at least one of the three beam deflectors being pivotable to transfer the beam splitter device from the first position into the second position.

25. The stereomicroscope according to claim 21, further comprising a connector wherein the connector for the documentation module is displaceable in a direction parallel to the stereo base by a distance which is at least equal to a distance defined by the stereo base.

26. The stereomicroscope according to claim 1, wherein the assistant's beam path and the documentation beam path are each comprised of a single beam.

* * * * *